(12) United States Patent
Cook et al.

(10) Patent No.: US 7,626,948 B1
(45) Date of Patent: Dec. 1, 2009

(54) SYSTEM AND METHOD FOR VERIFYING THE VALIDITY OF A PATH IN A NETWORK ENVIRONMENT

(75) Inventors: David A. Cook, Raleigh, NC (US); James L. Ng, Mebane, NC (US); Alvaro E. Retana, Morrisville, NC (US); Russell I. White, Holly Springs, NC (US)

(73) Assignee: Cisco Technology, Inc., San Jose, CA (US)

( * ) Notice: Subject to any disclaimer, the term of this patent is extended or adjusted under 35 U.S.C. 154(b) by 939 days.

(21) Appl. No.: 10/661,326

(22) Filed: Sep. 12, 2003

(51) Int. Cl.
*H04L 12/28* (2006.01)

(52) U.S. Cl. .................. 370/256; 370/400; 709/230; 709/238

(58) Field of Classification Search ......... 370/400–408, 370/250, 244, 248, 255, 411, 256, 219, 220, 370/236, 389, 473; 709/223–224, 230, 239
See application file for complete search history.

(56) References Cited

U.S. PATENT DOCUMENTS

| | | | |
|---|---|---|---|
| 5,345,558 A | 9/1994 | Opher et al. | 395/200 |
| 5,511,122 A | 4/1996 | Atkinson | 380/25 |
| 5,590,118 A | 12/1996 | Nederlof | 370/218 |
| 5,757,924 A | 5/1998 | Friedman et al. | 380/49 |
| 5,881,243 A * | 3/1999 | Zaumen et al. | 709/241 |
| 5,926,101 A | 7/1999 | Dasgupta | 340/825.02 |
| 6,009,081 A * | 12/1999 | Wheeler et al. | 370/255 |
| 6,055,561 A | 4/2000 | Feldman et al. | 709/200 |
| 6,069,889 A | 5/2000 | Feldman et al. | 370/351 |
| 6,130,889 A | 10/2000 | Feldman et al. | 370/397 |
| 6,148,000 A | 11/2000 | Feldman et al. | 370/397 |
| 6,269,099 B1 * | 7/2001 | Borella et al. | 370/389 |
| 6,392,997 B1 * | 5/2002 | Chen | 370/252 |
| 6,393,486 B1 | 5/2002 | Pelavin et al. | 709/238 |
| 6,553,423 B1 * | 4/2003 | Chen | 709/230 |
| 6,567,380 B1 * | 5/2003 | Chen | 370/238 |
| 6,584,093 B1 | 6/2003 | Salama et al. | 370/351 |
| 6,757,258 B1 * | 6/2004 | Pillay-Esnault | 370/254 |
| 6,795,399 B1 * | 9/2004 | Benmohamed et al. | 370/235 |
| 6,909,700 B1 * | 6/2005 | Benmohamed et al. | 370/255 |

(Continued)

OTHER PUBLICATIONS

Gao, "On Inferring Autonomous System Relationships in the Internet", Dec. 2001, IEEE/ACM Transactions on Networking, vol. 9, p. 733-745.*

(Continued)

*Primary Examiner*—Dang T Ton
*Assistant Examiner*—Brian O'Connor
(74) *Attorney, Agent, or Firm*—Baker Botts L.L.P.

(57) ABSTRACT

A method for verifying a validity of a path is provided that includes receiving an advertisement communication at a first autonomous system from a second autonomous system, the advertisement communication including a list of one or more connected autonomous systems. The method also includes identifying whether the first autonomous system claims a connection to the second autonomous system and whether the second autonomous system claims a connection to the first autonomous system such that two-way connectivity is established between the autonomous systems. In response to the establishment of the two-way connectivity, a directed graph is constructed that includes two nodes representing the first and second autonomous systems respectively. An edge may be formed that connects the two nodes.

21 Claims, 1 Drawing Sheet

U.S. PATENT DOCUMENTS

| | | | |
|---|---|---|---|
| 7,085,279 B1 * | 8/2006 | Kumar et al. | 370/401 |
| 7,133,370 B2 * | 11/2006 | Ikeda et al. | 370/255 |
| 7,236,453 B2 * | 6/2007 | Visser et al. | 370/219 |
| 7,327,683 B2 * | 2/2008 | Ogier et al. | 370/236 |
| 7,388,862 B2 * | 6/2008 | Tran et al. | 370/389 |
| 7,391,730 B1 * | 6/2008 | Chandra et al. | 370/236 |
| 2003/0112799 A1 * | 6/2003 | Chandra et al. | 370/389 |
| 2003/0120769 A1 * | 6/2003 | McCollom et al. | 709/224 |
| 2006/0182034 A1 * | 8/2006 | Klinker et al. | 370/238 |

OTHER PUBLICATIONS

Xiao et al, "Optimizing IBGP Route Reflection Network", May 11-15, 2003, IEEE Intl. Conference on Communications, 2003, vol. 3, p. 1765-1769.*

J. Rosenberg, H. Salama, M. Squire, Telephony Routing Over IP (TRIP), Network Working Group, RFC 3219, 74 pgs, Jan. 2002.

* cited by examiner

SYSTEM AND METHOD FOR VERIFYING THE VALIDITY OF A PATH IN A NETWORK ENVIRONMENT

TECHNICAL FIELD OF THE INVENTION

This invention relates in general to the field of communications and, more particularly, to a system and method for verifying the validity of a path in a network environment.

BACKGROUND OF THE INVENTION

The field of communications has become increasingly important in today's society. One area of importance associated with network communications relates to routing. Routing protocols allow one or more components, devices, or modules to correctly direct information to its appropriate destination. Certain paths or designated routes may be considered optimal or preferred over others. Additionally, it is generally important to ensure that a path being advertised or offered to various network elements is valid, as the integrity of communications are directly affected by the accuracy of routing information.

As traffic and the subscriber base of end users increases, so too does the importance of proper routing and efficient management of communication sessions and data flows. Some network equipment may provide incorrect path information or inaccurate data for other network elements, which rely on the erroneous information in determining an optimal route or subsequent destination. Deficient or inferior routing processes may cause network instability, whereby network equipment is susceptible to routing information incorrectly, managing communications improperly, breaching security parameters, or losing/dropping information. Thus, the ability to accurately manage or direct information in a network environment provides a significant challenge to network operators and system designers.

SUMMARY OF THE INVENTION

From the foregoing, it may be appreciated by those skilled in the art that a need has arisen for an improved communications approach that offers proper path validation for autonomous systems in a network environment. In accordance with one embodiment of the present invention, a system and a method for verifying the validity of a path in a network environment are provided that substantially eliminate or greatly reduce disadvantages and problems associated with conventional communication techniques.

According to one embodiment of the present invention, there is provided a method for verifying the validity of a path that includes receiving an advertisement communication at a first autonomous system from a second autonomous system, the advertisement communication including a list of one or more connected autonomous systems. The method also includes identifying whether the first autonomous system claims a connection to the second autonomous system and whether the second autonomous system claims a connection to the first autonomous system such that two-way connectivity is established between the autonomous systems. In response to the establishment of the two-way connectivity, a directed graph is constructed that includes two nodes representing the first and second autonomous systems respectively. An edge may be formed that connects the two nodes.

Certain embodiments of the present invention may provide a number of technical advantages. For example, according to one embodiment of the present invention, a path validity approach is provided that allows connectivity information to be advertised independent of any routing (reachability) information. This, in turn, may allow any protocol for propagating routing information to remain unchanged and independent of changes in topology. The amount of encryption for such path-verification approaches is also minimized because encryption processing only needs to take place when advertisements of connectivity are received and not necessarily for every path that is received. A two-way connectivity check forces at least two autonomous systems to cooperate to confirm or reject a path through an internetwork. It is also noteworthy that while the main purpose of such a type of path advertisement is to communicate existing topology information, the advertisement may also be used to signal a lack of connectivity. For a border gateway protocol (BGP), this lack of connectivity can be translated into an implicit withdraw of all routes that included the connection in question in their autonomous system path. As a result, faster convergence may be achieved, resulting in optimal data management capabilities in the network.

Another technical advantage associated with one embodiment of the present invention is a result of the architecture of the communication system. The enhancement in integrity in paths that are advertised ensures that information is securely routed to its intended next destination. This could address security concerns in cases where a spoofed or a bogus is address is being advertised as providing a valid path for information propagating through the network. Such a scenario could be readily avoided with use of a two-way connectivity check. Additionally, adjustments and/or additions to existing (i.e. legacy) components may be effectuated in order to allow for this enhanced validation approach. In a general sense, many types of network architectures could be quickly and easily upgraded in order to perform more effective routing procedures. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS OF THE INVENTION

Figure 1:
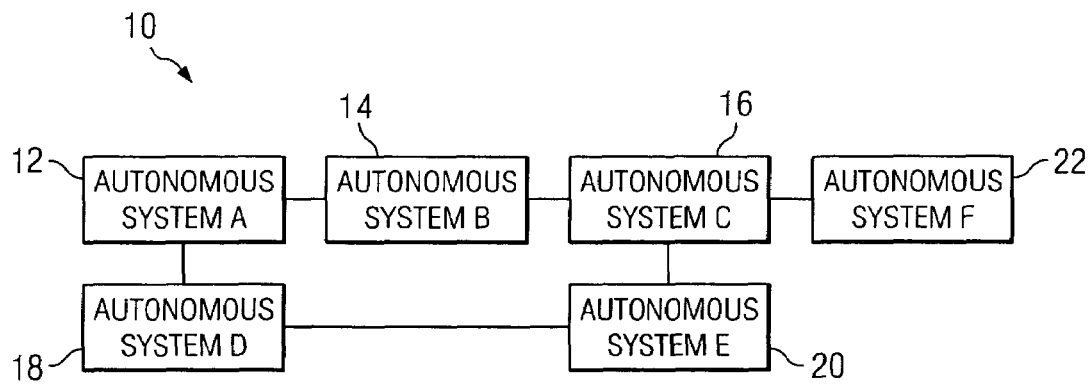
FIG. 1 is a simplified block diagram of a communication system for verifying the validity of a path in a network environment.

FIG. 1 is a simplified block diagram of a communication system 10 for verifying the validity of a path in a network environment in accordance with one embodiment of the present invention. Communication system 10 includes a set of autonomous systems 12, 14, 16, 18, 20, and 22. For purposes of illustration, each of autonomous systems 12, 14, 16, 18, 20, and 22 is designated as A-F respectively. These designations are arbitrary and have been used for purposes of teaching some of the example operations of communication system 10. The designations do not reflect any hierarchy, priority, or any other characteristic or networking parameter. Communication system 10 may be positioned in any suitable network environment or communications architecture that operates to manage or otherwise direct information using any appropriate routing protocol or data management standard. For example, communication system 10 may be provided in conjunction with a border gateway protocol (BGP). Note that the term BGP is inclusive of internal BGP (IBGP) and exterior BGP (EBGP) as used herein in this document.

In accordance with the teachings of the present invention, communication system 10 allows an autonomous system path (also referred to an 'AS_PATH') advertised in BGP updates to be verified through a topology map (directed graph) built through the advertisement of connectivity. Two-way connectivity checks may be used to verify connectivity through the internetwork. Communication system 10 further offers a protocol that may be applied to a distance (or path) vector protocol.

There is generally not an effective way in BGP (or various other protocols) to determine if the AS_PATH advertised in a routing update is in fact a valid path through an internetwork. In general, a system is needed that allows for the validation of an AS_PATH (i.e. that the path is valid and presents a viable path through the internetwork to reach an advertised destination). In the context of an example application that illustrates this issue, an autonomous system may receive an update from a peer. The update may indicate that in order to get to point 'X' data should flow through a given autonomous system (e.g. autonomous system 12) and then through several other autonomous systems (e.g. autonomous system 14, autonomous system 16, etc.). It would be beneficial if the receiving autonomous system would be capable of verifying that these advertised autonomous systems are indeed connected as advertised.

Communication system 10 addresses this issue in the following manner. Each autonomous system may advertise a list of connected autonomous systems to all other autonomous systems in the internetwork (e.g. in a cryptographically signed certificate). The list of each connected autonomous system may be used to build a database of connections, which in turn is used to build a directed graph of the topology of the internetwork. Each connection can be verified using a two-way connectivity check in order to properly validate the advertised path and, thereby, resolve this issue identified above.

Communication system 10 offers a path validity approach that allows connectivity information to be advertised independent of any routing (reachability) information. This, in turn, may allow any protocol for propagating routing information to remain unchanged and independent of changes in topology. The amount of encryption for such a path-validation process is also minimized because encryption processing only takes place when advertisements of connectivity are received: not for every path that is received. The two-way connectivity check forces at least two autonomous systems to cooperate to confirm (or reject) a path through an internetwork. It is also noteworthy that while the main purpose of the advertisement is to communicate existing topology information, it may also be used to signal a lack of connectivity. For a given BGP, this lack of connectivity can be translated into an implicit withdraw of all routes that included the connection in question in their autonomous system path. As a result, faster convergence may be achieved, which results in optimal data management capabilities being provided to the network. Convergence is a principle that generally reflects a concept in which a consistent view or a common status is shared by one or more network elements that are associated with the routing or management of information. Convergence may also represent a fluid concept in that any one or more components, devices, elements, or any other piece of network equipment may move into a state of convergence and then become unconverged. During such states of instability, network equipment may be susceptible to routing information incorrectly or managing communications improperly. Thus, the speed of convergence can be critical to any effective routing protocol for a given network.

Communication system 10 also offers an enhancement to the integrity in paths that are advertised, ensuring that information is securely routed to its intended next destination. This could address security concerns in cases where a spoofed or a bogus address is being advertised as providing a valid path for information propagating through the network. Additionally, adjustments and/or additions to existing (i.e. legacy) components may be effectuated in order to allow for this enhanced validation approach. In a general sense, many types of network architectures could quickly and easily be upgraded in order to perform more effective routing procedures. Communication system 10 may be used in conjunction with inter-domain routing and communication system 10 may be enforced independently by an autonomous system, regardless of whether another entity chooses to implement the protocol or ignore it.

Autonomous systems 12, 14, 16, 18, 20, and 22 are a group of routers (potentially edge routers) in accordance with one embodiment, but may alternatively be a switch, a bridge, a gateway, a processor, a loadbalancer, or any other suitable component, device, element, or object operable to exchange information or data. The routers included in a given autonomous system may be under a common administrative control (e.g. Cisco, SprintLink, etc.). The potential elements and components included within autonomous systems 12, 14, 16, 18, 20, and 22 may be referred to as 'network elements' herein in this document. Additionally, each of autonomous systems 12, 14, 16, 18, 20, and 22 may include any suitable hardware, processors, modules, algorithms, software, components, or elements operable to execute one or more of the operations thereof or to provide some communication or processing capability to communication system 10.

In a particular embodiment of the present invention, one or more of autonomous systems 12, 14, 16, 18, 20, and 22 execute BGP and include a capability to perform two-way connectivity, graph building, and path confirmation operations as described herein. Such capabilities may be implemented via a modification or addition in code or via a software implementation in cooperation with BGP to accommodate such operations. Alternatively, autonomous systems 12, 14, 16, 18, 20, and 22 may accommodate this verification approach via any other suitable manner with the potential use of any appropriate algorithms, hardware, software, modules, components, or elements operable to execute these tasks.

In operation of an example embodiment, messaging within a given protocol (e.g. BGP) may be used to advertise or to communicate a list of connected autonomous systems. The message may offer the list and be suitably encrypted with a private key, whereby a receiving autonomous system can use a public key in order to verify that the list has actually be sent. Information relating to the confirmed (or potential) connections may be stored within a table included within each of the network elements (e.g. routers) included within autonomous systems 12, 14, 16, 18, 20, and 22. The table may be properly stored in a database provided in the network elements. The list of autonomous systems that each autonomous system advertises may be used to build a directed graph of the topology of the internetwork at an autonomous system level. No single advertisement is necessarily considered authoritative. For example, where autonomous system 12 claims connectivity to autonomous system 14, autonomous system 14 must also claim connectivity to autonomous system 12 before the connection can be verified. This achieves the two-way connectivity check. Note that an autonomous system may know who it is connected to through peering sessions (e.g. manually configured) and potentially via BGP sessions that involve edge routers. The directed graph is representative of the type of graph relating to graph theory and may offer a diagram of the network. The graph may further provide a manner of looking at a space that has nodes and edges. In this sense, the directed graph may be somewhat akin to a shortest-path tree in offering an example schematic of various locations and routes in the network. Each autonomous system may be taken as a node on the graph, whereby the connection between the nodes forms edges. The connections are what may be built in determining which autonomous system is connected to any other autonomous system.

In an example embodiment, communication system 10 operates in conjunction with a suitable gateway routing protocol (e.g. BGP). In order to explain some of the features of communication system, it is appropriate that an overview of BGP be provided. It is critical to note that such a discussion has been offered for purposes of example and teaching only and, therefore, should not be construed in any way to limit the broad scope or various potential applications of communication system 10. By way of example, BGP is described with reference to a group of edge routers.

BGP, generally defined in RFC 1771, allows a user or a system designer to create loop-free interdomain routing between autonomous systems. Routers in an autonomous system can use multiple interior gateway protocols to exchange routing information inside the autonomous system and an exterior gateway protocol to route packets outside the autonomous system. BGP may use transmission control protocol (TCP) as its transport protocol (e.g. port 179). Two BGP routers may form a TCP connection between one another (peer routers) and exchange messages to open and confirm the connection parameters. BGP routers may exchange network reachability information. This information is mainly an indication of the full paths (BGP autonomous system numbers) that a route should take in order to reach the destination network. This information helps in constructing a graph of autonomous systems that are loop-free and where routing policies can be applied in order to enforce some restrictions on the routing behavior.

Any two routers that have formed a TCP connection in order to exchange BGP routing information are called peers or neighbors. BGP peers initially exchange their full BGP routing tables. After this exchange, incremental updates are sent as the routing table changes. BGP keeps a version number of the BGP table, which should be the same for all of its BGP peers. The version number may change whenever BGP updates the table due to routing information changes. Keepalive packets may be sent to ensure that the connection is alive between the BGP peers and notification packets may be sent in response to errors or special conditions.

It is necessary to ensure reachability for networks within an autonomous system before sending the information to external autonomous systems. This is done by a combination of internal BGP peering between routers inside an autonomous system and by redistributing BGP information to internal gateway protocols (IGPs) running in the autonomous system. When BGP is running between routers belonging to two different autonomous systems, the protocol used may be referred to as an exterior BGP (EBGP). When BGP is running between routers in the same autonomous system it may be referred to as an iBGP.

Once the TCP connection is up between two autonomous systems, the routers send open messages in order to exchange values such as the autonomous system number, the BGP version they are running, the BGP router ID, and the keepalive hold time. After these values are confirmed and accepted, the neighbor connection is established. Any state other than "established" is an indication that the two routers did not become neighbors and BGP updates will not be exchanged.

After BGP receives updates about different destinations from different autonomous systems, the protocol may decide which paths to choose in order to reach a specific destination. BGP may choose only a single path to reach a specific destination. The decision process may be based on different attributes such as next hop, administrative weights, local preference, the route origin, path length, origin code, metric, etc. BGP may propagate the best path to its neighbors.

In operation of an example embodiment used for purposes of example and teaching only, each autonomous system 12, 14, 16, 18, 20, and 22 may advertise its connections to other autonomous systems. For example, autonomous system 12 may claim to be connected to autonomous system 14 and autonomous system 18. Autonomous system 14 may claim to be connected to autonomous system 16 and autonomous system 12. Autonomous system 16 may claim to be connected to autonomous system 14, autonomous system 20, and autonomous system 22. Autonomous system 18 may claim to be connected to autonomous system 12 and autonomous system 20. Autonomous system 20 may claim to be connected to autonomous system 16 and autonomous system 18. Autonomous system 22 may claim to be connected to autonomous system 16. From autonomous system 12's perspective, the database is walked searching for parents and children and building a directed graph.

Autonomous system 12 starts with itself and connects each connected autonomous system in the directed graph (autonomous system 14 and autonomous system 18), marking the connections to each of these peers as tentative. Autonomous system 14's advertisement is then examined and its connectivity to autonomous system 21 is verified. The verification may be done using a two-way connectivity check, comparing autonomous system 12 and autonomous system 14's advertisements in this case. Once the connection is verified, autonomous system 14's connection to autonomous system 12 is marked as verified. Autonomous system 16 is placed on the graph as a child of autonomous system 14 with its connection to autonomous system 14 marked as tentative.

Autonomous system 18's advertisement is then examined and its connectivity to autonomous system 12 is verified. Once this connectivity is verified, autonomous system 18's connection to autonomous system 12 is marked as verified. Autonomous system 18's other connected peer, autonomous system 20, is placed on the graph with its connection to autonomous system 18 marked as tentative. Autonomous system 16's advertisement is examined, and connectivity to its parent, autonomous system 14, is verified. Once this is verified, autonomous system 16's node on the graph is marked as verified. Autonomous system 16's advertisement may claim a connection to autonomous system 20 and to autonomous system 22. These nodes are placed on the graph with their connections to autonomous system 16 marked as tentative.

This process is continued until the end of the graph is reached, and all connections, which remain in the tentative state, are removed as unverified. At this point, if autonomous system 12 receives routing information from autonomous system 14 with an AS_PATH of autonomous system 14, autonomous system 16, and autonomous system 22, this path can be verified as valid by examining the validated connections in the directed graph previously built. However, if autonomous system 12 receives routing information from autonomous system 14 with an AS_PATH of autonomous system 14, autonomous system 20, autonomous system 22, this information can be discarded because the listed AS_PATH is not a valid path through the internetwork.

In another example, presume that autonomous system 22 would like to identify the topology based on the advertisements it receives. Autonomous system 22 may start with itself and readily recognize it is connected to autonomous system 16. Autonomous system 22 may identify whether autonomous system 16 claims to be connected to autonomous system 22. If the answer is yes, then such a connection reflects a true or valid connection on the graph such that it may be positioned on the directed graph to be maintained by autonomous system 22. Thus, a node for autonomous system 22 and a node for autonomous system 16 may be positioned on the graph and an edge may connect the two nodes. Autonomous system 22 may then turn to autonomous system 16 and identify the connectivity advertised by autonomous system 16 (in this case autonomous system 14, autonomous system 20, and autonomous system 22 [which has already been verified]). Autonomous system 22 may then look to the advertisement of autonomous system 14. If autonomous system 14 claims connectivity in a reciprocal fashion, then two-way connectivity would again be established.

In a next step, autonomous system 20 would be evaluated. This process of building would continue until the end of the internetwork is reached (i.e. the point where no more claimed neighbors need to be verified or validated). In this sense, communication system 10 provides an iterative process, whereby the end resultant is a map that reflects the topology of the internetwork. If any autonomous system claims to be connected to an autonomous system that does not claim them back, that edge is not placed on the directed graph that is built. At a later time when an update is received by any autonomous system, the autonomous system path may be taken from the update and a given autonomous system can confirm that a valid and true autonomous system path is being offered. This procedure could ensure that bogus or inaccurate information is not being relied on by any network element to misdirect information in the network. Note that in certain scenarios such a protocol may be used to implement networking policies where appropriate and in accordance with particular needs. Alternatively, the computational load could be reduced on any given autonomous system or network element by providing an administrator network element that could receive a directed graph and communicate this information to all network elements within its control. In a general sense, the processing demands of such operations could be consolidated at a single location, whereby valid information could be broadcasted to any specific element or location.

In other example scenarios, such a protocol could be used in security applications in validating advertised paths. Some advertisements may be erroneous and involve spoofing in order to steal the communication flows. Communication system 10 may avoid such a problem by providing a way to ensure that the advertised path is valid and true and, further, that the traffic is directed to its appropriate next destination. Thus, communication system 10 may be used in security applications with use of encryption to verify the validity of information. Communication system 10 is capable of validating routes before they are used.

Figure 2:
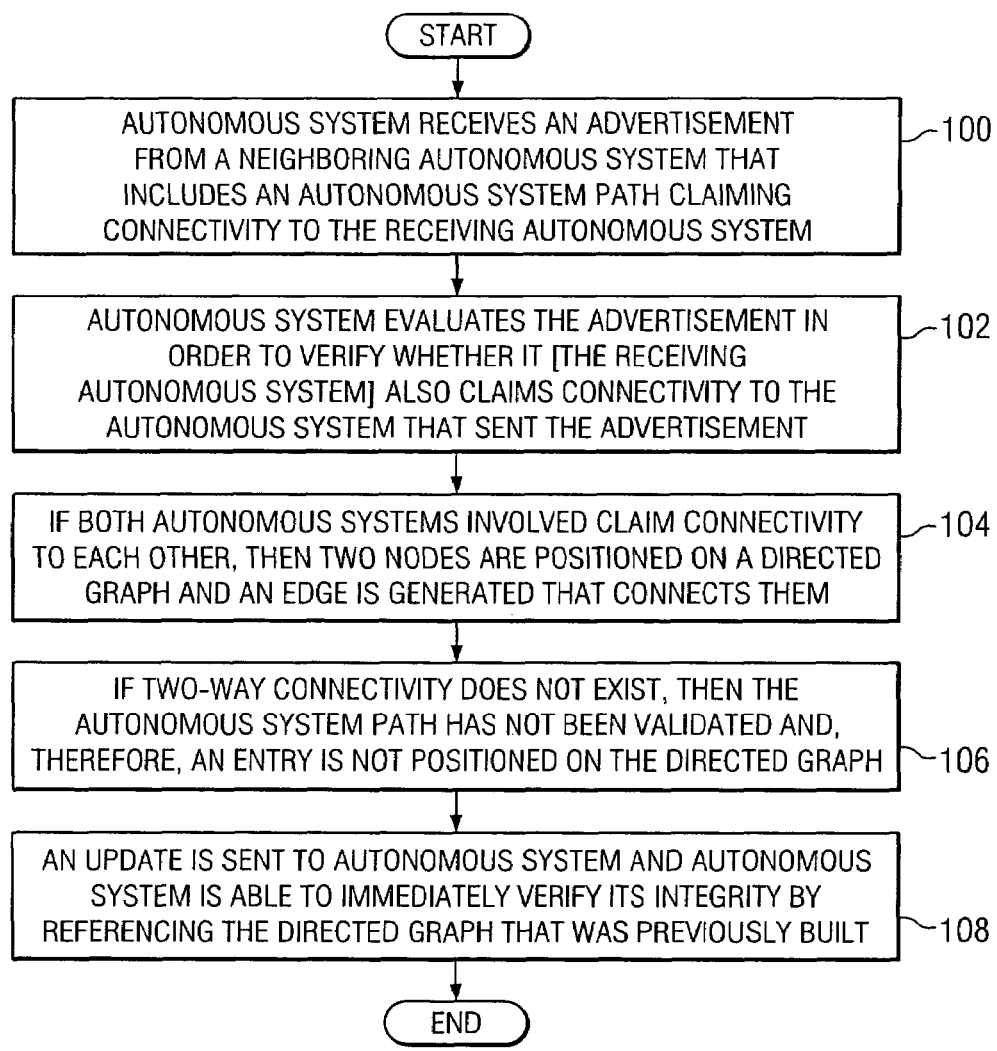
FIG. 2 is a flowchart illustrating a series of example steps associated with a method for verifying the validity of a path in a network environment.

FIG. 2 is a simplified flowchart illustrating a series of example steps associated with a method for verifying a path in a network environment. The method may begin at step 100 where autonomous system 12 receives an advertisement from a neighboring autonomous system 14 that includes an autonomous system path, which discloses connectivity existing between the two autonomous systems. At step 102, autonomous system 12 may evaluate the advertisement in order to verify whether it claims connectivity to the autonomous system that sent the advertisement.

At step 104, where both autonomous systems involved claim connectivity to each other, then two nodes are positioned on a directed graph and an edge is generated that connects them. This effectively confirms or verifies the proffered path. Step 106 reflects the case where two-way connectivity does not exist and the autonomous system path has not been validated. Therefore such an entry would not be positioned on the directed graph. Step 108 reflects an example case in which an update is sent to autonomous system 12 and autonomous system 12 is able to immediately verify its integrity by referencing the directed graph that was previously built.

Some of the steps illustrated in FIG. 2 may be changed or deleted where appropriate and additional steps may also be added to the flowchart. These changes may be based on specific system architectures or particular communication arrangements or configurations and do not depart from the scope or the teachings of the present invention.

It is also important to note that communication system 10 may be implemented in accordance with a number of routing protocols. The embodiments described with reference to FIGS. 1 and 2 and to the BGP standard have been offered for purposes of example only. Communication system 10 may be implemented with any other appropriate routing protocol in accordance with particular needs. Other protocols that may be readily implemented without departing from the scope of the present invention include (but are not limited to) any generic border gateway protocol (BGP), multi-protocol label switching (MPLS), express forwarding (EF), open shortest path first (OSPF) protocol, intermediate system-to-intermediate system (IS-IS) protocol, or any other suitable forwarding or routing protocol deemed appropriate.

Although the present invention has been described in detail with reference to particular embodiments, it should be understood that various other changes, substitutions, and alterations may be made hereto without departing from the spirit and scope of the present invention. For example, although the present invention has been described with reference to a particular internal configuration of autonomous systems, any one or more of these internal elements may be provided external to the autonomous system as its own separate component, element, or object. Additionally, although communication system 10 has been described as applying to path-verification strategies, the teachings of communication system 10 may be applied to any policy-implementation procedure or security configuration. Other scenarios may include any architecture that receives updates and seeks to confirm the accuracy of the information being offered.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant:

(a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus for verifying a validity of a path, comprising:
   a network element included in a first autonomous system that:
      constructs a directed graph comprising a plurality of nodes and a plurality of edges, a node representing an autonomous system, an edge representing a connection between two autonomous systems, the edges marked tentative;
      receives an advertisement communication from each respective autonomous system within an internetwork, the advertisement comprising a list of all autonomous systems connected to the respective autonomous system;
      for each advertisement received:
         determines from the respective received advertisement whether the respective autonomous system claims a connection to any of the other autonomous systems within the internetwork;
         determines from any other received advertisements whether any of the other autonomous systems within the internetwork claim a connection to the respective autonomous system;
         for each connection claimed by the respective autonomous system with another autonomous system within the internetwork that is reciprocated by the other autonomous system, establishes that there is two-way connectivity between the two autonomous systems;
         if there is two-way connectivity between the two autonomous systems, marks the edge representing the connection between the two autonomous systems as verified in the directed graph; and
         if there is no two-way connectivity between the two autonomous systems, removes the edge representing the connection between the two autonomous systems from the directed graph.

2. The apparatus of claim 1, wherein the network element receives an update message from a second autonomous system, the update message including an autonomous system path, and wherein the network element verifies the autonomous system path by referencing the directed graph.

3. The apparatus of claim 1, wherein the network element is a selected one of a group of elements consisting of:
   (a) a router;
   (b) a switch;
   (c) a bridge;
   (d) a gateway;
   (e) a loadbalancer; and
   (f) a processor.

4. The apparatus of claim 1, wherein the network element includes a table operable to store the directed graph and to be referenced in order to verify one or more autonomous system paths that are received by the network element in one or more update messages.

5. The apparatus of claim 1, wherein the advertisement communication is encapsulated in a border gateway protocol (BGP).

6. The apparatus of claim 1, wherein the network element communicates the directed graph to an administrator element that is operable to communicate information included within the directed graph to one or more additional network elements.

7. A method for verifying a validity of a path, comprising:
   constructing a directed graph comprising a plurality of nodes and a plurality of edges, a node representing an autonomous system, an edge representing a connection between two autonomous systems, the edges marked tentative;
   receiving an advertisement communication at a first autonomous system from each respective autonomous system within an internetwork, the advertisement comprising a list of all autonomous systems connected to the respective autonomous system;
   for each advertisement received:
      determining from the respective received advertisement communication whether the first autonomous system claims a connection to the respective autonomous system;
      determining from the advertisement communication whether the respective autonomous system claims a connection to any of the other autonomous systems within the internetwork, including the first autonomous system;
      for each connection claimed by the respective autonomous system with another autonomous systems within the internetwork that is reciprocated by the other autonomous system, establishing that there is two-way connectivity between the two autonomous systems;
      if there is two-way connectivity between the two autonomous systems, marking the edge representing the connection between the two autonomous systems as verified; and
      if there is no two-way connectivity between the two autonomous systems, removing the edge representing the connection between the two autonomous systems from the directed graph.

8. The method of claim 7, further comprising:
   receiving an update message from a second autonomous system, the update message including an autonomous system path, wherein a network element included in the first autonomous system verifies the autonomous system path by referencing the directed graph.

9. The method of claim 7, wherein the first autonomous system includes a network element that includes a table operable to store the directed graph and to be referenced in order to verify one or more autonomous system paths that are received by the network element in one or more update messages.

10. The method of claim 7, wherein the advertisement communication is encapsulated in a border gateway protocol (BGP).

11. The method of claim 7, wherein a network element included in the first autonomous system is operable to communicate the directed graph to an administrator element that is operable to communicate information included within the directed graph to one or more additional network elements.

12. A system for verifying a validity of a path, comprising:
   means for constructing a directed graph comprising a plurality of nodes and a plurality of edges, a node representing an autonomous system, an edge representing a connection between two autonomous systems, the edges marked tentative;

means for receiving an advertisement communication at a first autonomous system from each respective autonomous system within an internetwork, the advertisement comprising a list of all autonomous systems connected to the respective autonomous system;

for each advertisement received:

means for determining from the respective received advertisement communication whether the first autonomous system claims a connection to the respective autonomous system;

means for determining from the advertisement communication whether the respective autonomous system claims a connection to any of the other autonomous systems within the internetwork, including the first autonomous system;

means for, for each connection claimed by the respective autonomous system with another autonomous systems within the internetwork that is reciprocated by the other autonomous system, establishing that there is two-way connectivity between the two autonomous systems;

means for, if there is two-way connectivity between the two autonomous systems, marking the edge representing the connection between the two autonomous systems as verified; and means for, if there is no two-way connectivity between the two autonomous systems, removing the edge representing the connection between the two autonomous systems from the directed graph.

13. The system of claim 12, further comprising:

means for receiving an update message from a second autonomous system, the update message including an autonomous system path, wherein a network element verifies the autonomous system path by referencing the directed graph.

14. The system of claim 12, wherein the first autonomous system includes a network element that includes a table operable to store the directed graph and to be referenced in order to verify one or more autonomous system paths that are received by the network element in one or more update messages.

15. The system of claim 12, wherein the advertisement communication is encapsulated in a border gateway protocol (BGP).

16. The system of claim 12, wherein a network element included in the first autonomous system is operable to communicate the directed graph to an administrator element that is operable to communicate information included within the directed graph to one or more additional network elements.

17. Software embodied in a computer readable medium, the software comprising computer code such that when executed is operable to:

construct a directed graph comprising a plurality of nodes and a plurality of edges, a node representing an autonomous system, an edge representing a connection between two autonomous systems, the edges marked tentative;

receive an advertisement communication at a first autonomous system from each respective autonomous system within an internetwork, the advertisement comprising a list of all autonomous systems connected to the respective autonomous system;

for each advertisement received:

determine from the respective received advertisement communication whether the first autonomous system claims a connection to the respective autonomous system;

determine from the advertisement communication whether the respective autonomous system claims a connection to any of the other autonomous systems within the internetwork, including the first autonomous system;

for each connection claimed by the respective autonomous system with another autonomous systems within the internetwork that is reciprocated by the other autonomous system, establish that there is two-way connectivity between the two autonomous systems;

if there is two-way connectivity between the two autonomous systems, mark the edge representing the connection between the two autonomous systems as verified; and if there is no two-way connectivity between the two autonomous systems, remove the edge representing the connection between the two autonomous systems from the directed graph.

18. The medium of claim 17, wherein the code is further operable to:

receive an update message from a second autonomous system, the update message including an autonomous system path, wherein a network element verifies the autonomous system path by referencing the directed graph.

19. The medium of claim 17, wherein the first autonomous system includes a network element that includes a table operable to store the directed graph and to be referenced in order to verify one or more autonomous system paths that are received by the network element in one or more update messages.

20. The medium of claim 17, wherein the advertisement communication is encapsulated in a border gateway protocol (BGP).

21. The medium of claim 17, wherein a network element included in the first autonomous system is operable to communicate the directed graph to an administrator element that is operable to communicate information included within the directed graph to one or more additional network elements.

* * * * *

UNITED STATES PATENT AND TRADEMARK OFFICE
CERTIFICATE OF CORRECTION

PATENT NO. : 7,626,948 B1  Page 1 of 1
APPLICATION NO. : 10/661326
DATED : December 1, 2009
INVENTOR(S) : Cook et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1357 days.

Signed and Sealed this

Second Day of November, 2010

David J. Kappos
*Director of the United States Patent and Trademark Office*